(12) United States Patent
Engel

(10) Patent No.: US 6,169,653 B1
(45) Date of Patent: Jan. 2, 2001

(54) LATCH AND LOCATE CRADLE

(75) Inventor: Edward Ira Engel, Hamilton, OH (US)

(73) Assignee: Square D Company, Palatine, IL (US)

( * ) Notice: Under 35 U.S.C. 154(b), the term of this patent shall be extended for 0 days.

(21) Appl. No.: 09/217,152

(22) Filed: Dec. 21, 1998

(51) Int. Cl.[7] .................................................. H02B 1/00
(52) U.S. Cl. ........................... 361/600; 361/608; 361/636; 200/50.02
(58) Field of Search ................................... 361/600, 603, 361/617, 634, 636, 652; 200/50.02

(56) References Cited

U.S. PATENT DOCUMENTS

| | | | |
|---|---|---|---|
| 4,181,924 | * | 1/1980 | Thomas et al. ...................... 361/634 |
| 4,183,073 | * | 1/1980 | Clausing .............................. 361/617 |
| 4,768,131 | * | 8/1988 | Schultz et al. ....................... 361/608 |

* cited by examiner

*Primary Examiner*—Leo P. Picard
*Assistant Examiner*—Boris L. Chervinsky
(74) *Attorney, Agent, or Firm*—David R. Stacey; Larry I. Golden; Larry T. Shrout

(57) ABSTRACT

An apparatus for providing precise alignment between primary and secondary contacts mounted on a circuit breaker and associated stationary primary and secondary contacts located with substantial precision with respect to X, Y and Z coordinates and mounted on a back panel of a switchgear breaker compartment. A locking/locate cradle is provided with two generally parallel guide rails that slidably receive and support the circuit breaker within the breaker compartment. The precise X, Y and Z-axes alignment of the guide rails with the X, Y and Z axes position of the stationary primary and secondary contacts on the back panel is crucial for proper mating and connection with the associated breaker primary and secondary contact. The back panel is provided with at least one alignment slot having two indexing sections spaced apart by an aligning section. The two indexing sections are located with substantial precision with respect to X, Y and Z coordinates of the back panel and the X, Y and Z coordinate position of the stationary primary and secondary contacts mounted on the back panel. At least one of the guide rails is provided with a locking tab, which is frictionally received within the alignment slot. The alignment section of the alignment slot is dimensioned to permit a locking tab having X-axis misalignment to be inserted in the alignment slot and shaped to direct the misaligned locking tab into proper X-axis alignment with the back panel. The locking tab also includes a Z-axis alignment slot which interlocks with a top edge of the alignment slot to provide Z-axis alignment between the guide rail and the back panel. This interlocking of the Z-axis alignment slot and the top of the alignment slot also locks the locking/locate cradle to the back panel. A Y-axis alignment section of the locking tab is dimensioned to frictionally fit between the top and bottom of the alignment slot providing Y-axis alignment between the guide rail and the back panel. By maintaining a precise X, Y and Z-axes alignment between the guide rail and the back panel the proper alignment between the breaker primary and secondary contacts and their associated stationary primary and secondary contacts is also maintained.

21 Claims, 10 Drawing Sheets

LATCH AND LOCATE CRADLE

FIELD OF THE INVENTION

The present invention relates to electrical switchgear and specifically to locating and supporting mechanisms for draw-out circuit breakers.

BACKGROUND OF THE INVENTION

Draw-out circuit breakers are well known in the switchgear and panel board industry. The draw-out breaker is slidably received within a drawer-like breaker compartment dimensioned to snugly receive the breaker. Since draw-out breakers can be very large and heavy (100–400 lbs.), it is common to place the breaker on rails that are extendable from the breaker compartment. The breaker can then be racked into one of several positions within the breaker compartment by a worm screw and cam mechanism. At least one of these several positions involves the engagement of primary and secondary movable contacts mounted on the back of the breaker, with associated primary and secondary stationary contacts mounted at the back of the breaker compartment. The primary contacts carry line current into the breaker and load current out of the breaker and, therefore, are generally large. The secondary contacts, which provide monitoring and control connections for the breaker, are generally small compared to the primary contacts. As circuit breaker technology has advanced, the number of secondary contacts required has increased and the physical size of the breaker has generally decreased. Therefore, the available space for secondary contacts has also decreased, thus causing the secondary contacts to be positioned even closer together (miniaturized connectors). It is very important that the movable contacts, both primary and secondary, be properly aligned in the X, Y and Z-axes with their associated stationary contacts mounted in the breaker compartment. In the case of draw-out breakers, which are slidably positioned within the breaker compartment, contact alignment is a function of the breaker and contact support assemblies of the breaker compartment. These support assemblies have been constructed of formed sheet metal parts, which are inherently subject to a buildup of tolerances. Further, the assembly of the formed parts is critical to the proper alignment of the primary and secondary movable contacts on the breaker with the associated primary and secondary stationary contacts in the breaker compartment. It is therefore desirable to incorporate an assembly process that effectively eliminates the tolerance buildup associated with formed sheet metal parts and the critical alignment issues of the assembly process. It is also desirable that the assembly process be self-correcting such that any part that can be misaligned due to a forming process will be brought into properly alignment by the assembly process.

SUMMARY OF THE INVENTION

The present invention provides a one-piece circuit breaker support cradle in which all features critical for contact alignment are precisely punched by a CNC (Computer Numerical Control) machine and remain in the flat after any forming of the support cradle is done. The back panel of the breaker compartment, on which the primary and secondary stationary contacts are mounted or in some fixed relationship with, has all features critical to alignment precisely punched by a CNC machine. The alignment features of the back panel also remain in the flat after any forming of the back panel is done. By eliminating the buildup of tolerances associated with sheared part blanks, formed flanges, and screw type fastening hardware commonly used to support and align a circuit breaker within the breaker compartment, a more precise alignment of contacts is accomplished. The alignment means includes a uniquely shaped slot and locking tab arrangement configured such that a slight friction fit between alignment features of the locking tab and slot ensure precise alignment. The locking tab and slot are also configured such that misalignments between the breaker cradle and the back panel of the breaker compartment caused by metal forming will automatically be corrected during assembly. The design of the locking tab also provides an integrally formed levering feature which makes the friction fit installation of the locking tab into the slot much easier. Once assembled, the friction fit of the alignment slot and locking tab provides precise X, Y and Z-axis alignment between the breaker cradle and the back panel of the breaker compartment. The locking feature of the locking tab ensures that X, Y and Z-axis movement between the two parts is prohibited. Further, secondary attachment means such as screws or rivets will not affect the X, Y or Z-axis alignment between the breaker cradle and back panel. The breaker cradle also includes breaker alignment flanges that prevent X-axis movement of the breaker with respect to the breaker cradle, as might be expected during a seismic event.

Figure 1:
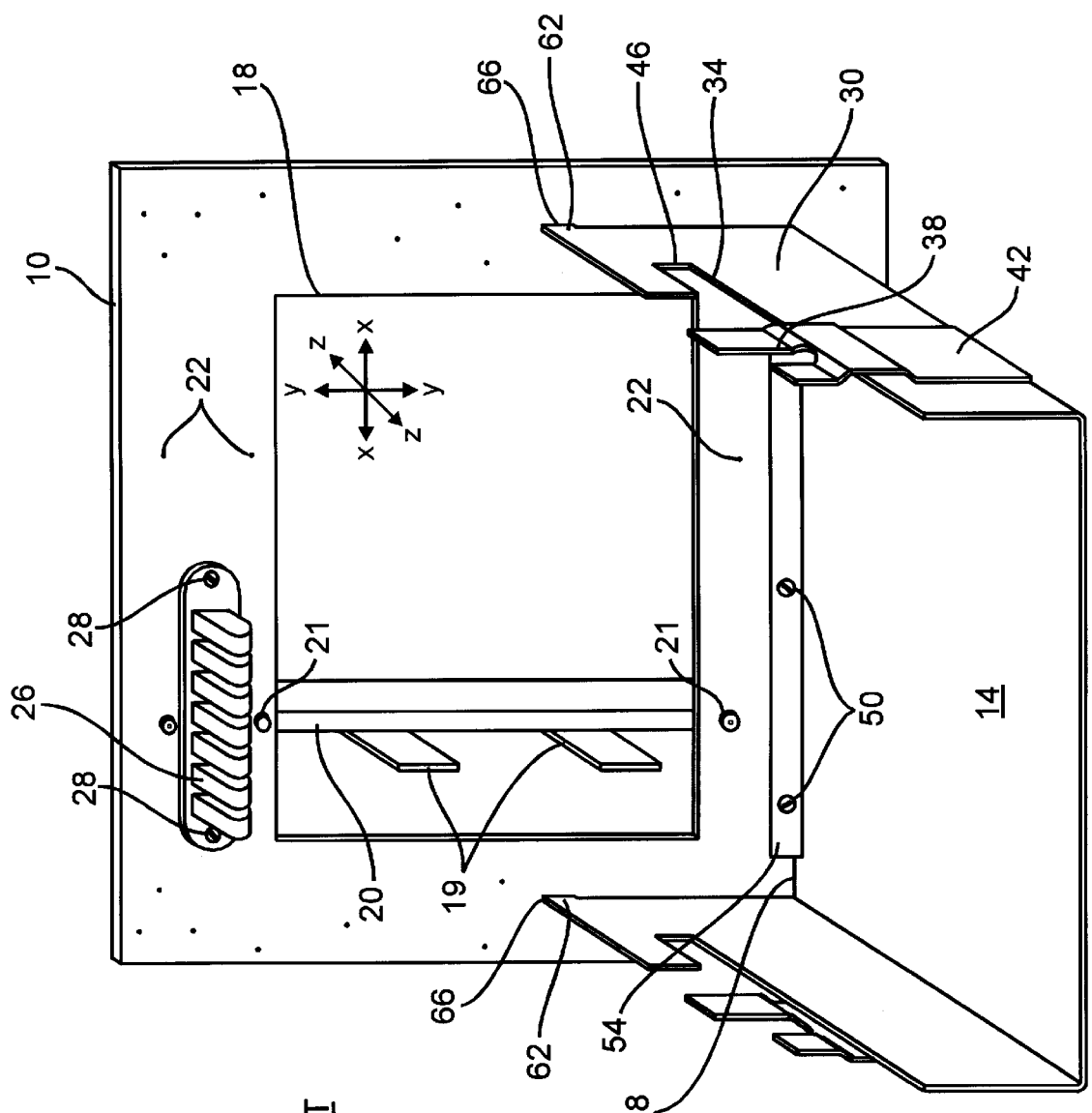
FIG. 1 illustrates a typical back panel and breaker support arrangement of the prior art.

Before one embodiment of the invention is explained in detail, it is to be understood that the invention is not limited in its application to the details of construction in the description or illustrated in the drawings. The invention is capable of other embodiments and of being practiced or being carried out in various other ways. Also, it is to be understood that the phraseology and terminology used herein is for the purpose of description and should not be regarded as limiting.

DETAILED DESCRIPTION OF THE DRAWINGS

Figure 3:
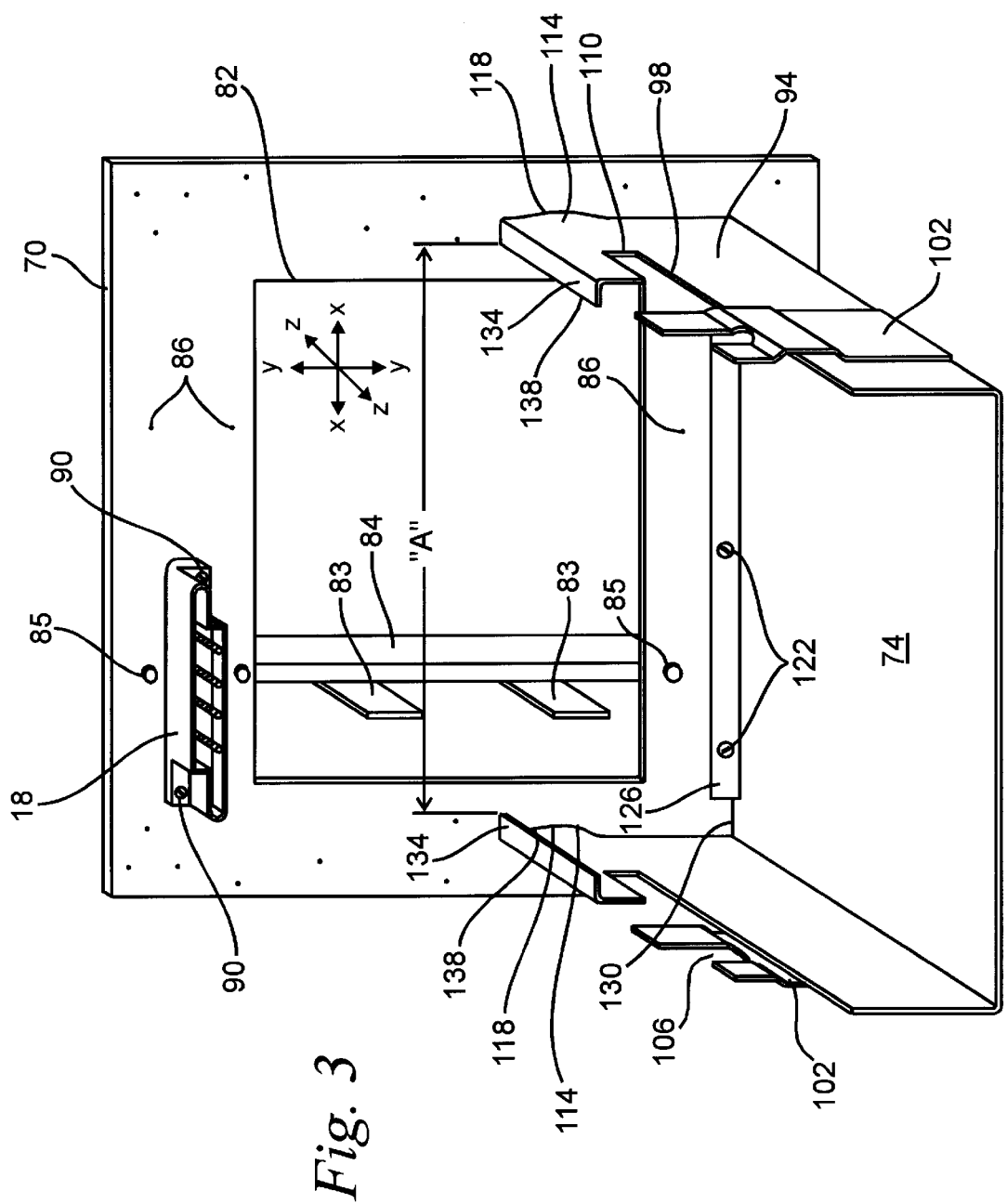
FIG. 3 illustrates a back panel and locate and locking cradle constructed in accordance with the present invention.

As used herein, references to X, Y, and Z axes and coordinates are in the sense in which they are normally used in mathematics, where X is the horizontal axis, Y is the vertical axis and Z is the depth axis. For purposes of clarity, these axes are shown in FIGS. 1 and 3.

FIG. 1 illustrates a back panel 10 and circuit breaker cradle 14 typical of prior art devices designed for draw-out type circuit breakers. The back panel 10 is a generally flat barrier placed at the back of a circuit breaker compartment located in a switchgear enclosure or other similar enclosure designed for draw-out type circuit breakers. The back panel is provided with an access opening 18 through which access to the stationary line and load (primary) contacts 19 is obtained. The stationary primary contacts 19 are generally fixed to the back panel 10 by bracing or other support means 20 attached to the back panel 10 by mechanical fasteners 21 received in mounting holes 22 provided in the back panel 10. The mounting holes 22 are located such that the position of the stationary primary contacts 19 is generally maintained with respect to the back panel 10. The back panel 10 also provides a surface on which any stationary secondary contacts 26, used for connecting monitoring and or control circuits to the circuit breaker, can be mounted. The stationary secondary contacts 26 are generally mounted on the inside surface (breaker side) of the back panel 10 immediately adjacent the access opening 18. They are attached by mechanical fasteners, such as screws 28, which are received in mounting holes (not shown) provided in the back panel 10. The stationary secondary contact mounting holes are located, as are the mounting holes 22, such that the position of the stationary secondary contacts is generally maintained with respect to the back panel 10. The circuit breaker cradle 14 is generally U-shaped with the two parallel sides forming guide rails 30. A top edge 34 of each guide rail 30 provides a smooth straight surface on which grooved rollers attached to each side of the circuit breaker are captivated and permitted to glide. The circuit breaker, as is common with draw-out type circuit breakers, is racked into and out of the circuit breaker enclosure by a worm screw mechanism that operates synchronized cams located on each side of the circuit breaker. Each cam has an eccentric pin that engages a racking slot 38 located in a levering bracket 42 attached to each guide rail 30. As the worm screw mechanism is operated, the eccentric pin moves up or down in the racking slot 38, which causes the circuit breaker to be racked into or out of the breaker compartment. A stop notch 46 is provided in each of the guide rails 30 to act as a stop for the circuit breaker rollers, thus preventing the circuit breaker from being racked too far into the breaker compartment.

Figure 2:
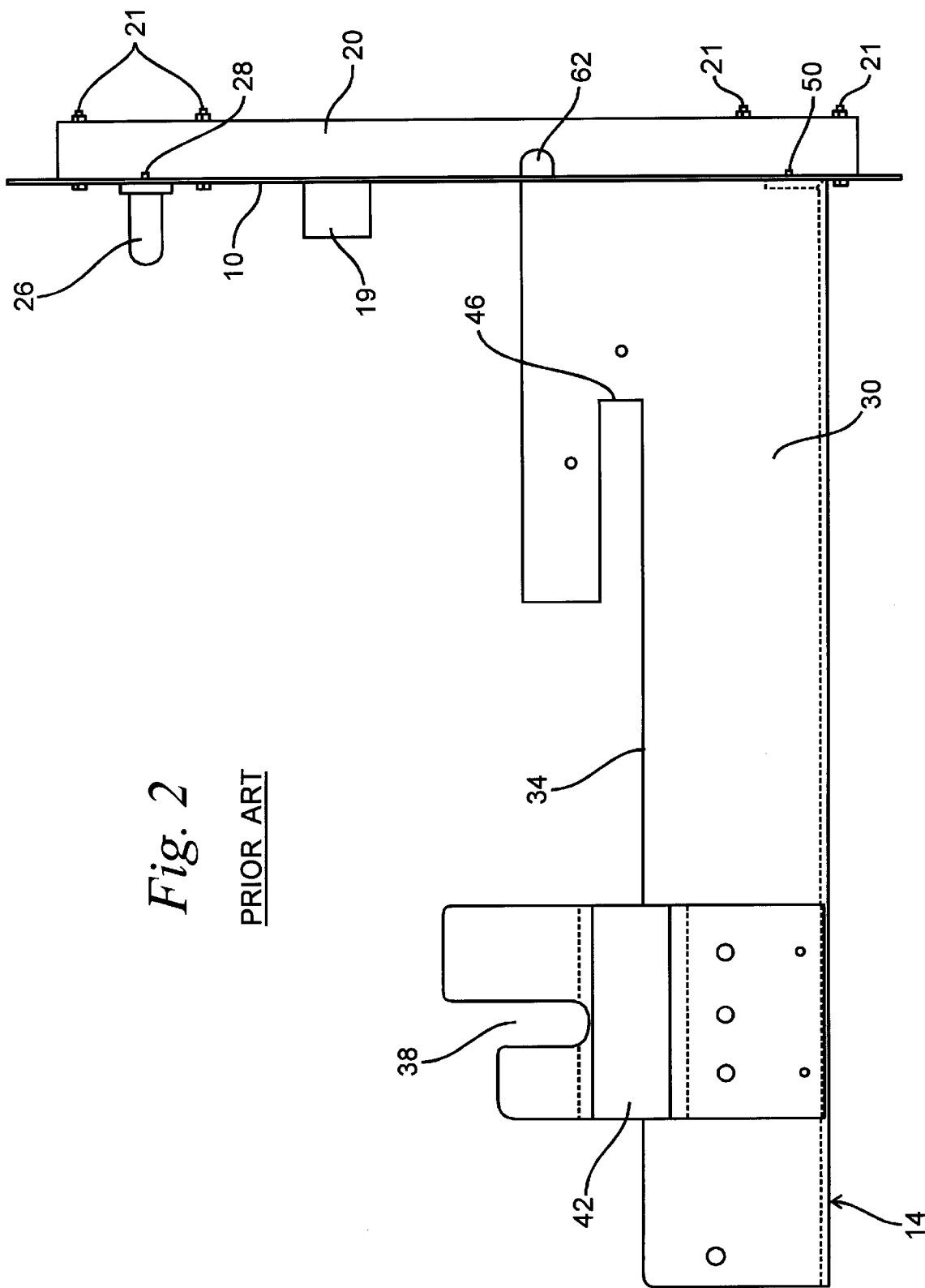
FIG. 2 is a side view of the back panel and breaker support arrangement of FIG. 1.

The breaker cradle 14 is attached to the back panel 10 by mechanical hardware, such as screws 50, passing through clearance holes in a flange 54 that is formed along the back bottom edge 58 of the breaker cradle 14. When the breaker cradle 14 is installed, the screws 50 thread into holes provided in the back panel 10 such that the flange 54 is drawn tightly against the back panel 10. Therefore, any overforming or underforming of the flange 54 can cause the breaker cradle 14 to be attached at a slight angle with respect to the back panel 10. This angle can cause the distance between the stop notch 46 and the back panel 10 to vary, resulting in misalignment between the breaker cradle 14 and back panel 10 along the Z-axis. Inaccurate forming of the flange 54 width or inaccurate placement of the clearance holes in the flange 54 can cause misalignment between the guide rail 30 and the primary and secondary stationary contact mounting holes in the back panel. This will result in misalignment between the breaker cradle 14 and back panel 10 along the Y-axis. There is also a generally rectangular tab 62, shown in FIG. 2, extending from the back edge of, and generally along the longitudinal axis of each guide rail 30. Each tab 62 is received within a slot 66 punched in the back panel 10. The tab 62 and slot 66 provide some general X-axis alignment between the breaker cradle guide rails 30 and the back panel 10. However, the degree of X-axis alignment is dependent upon the width of the slots 66. The best X-axis alignment would require a snug friction fit between the tab 62 and slot 66. However, the slots 66 must be wide enough to permit a relatively easy insertion of the tabs 62, which can be difficult under the best conditions since the back panel 10 is located at the rear of the breaker compartment. Assembly is generally accomplished by sliding the breaker cradle 14 into the breaker compartment until the tabs 62 have been received in the slots 66 and the flange 54 is resting against the back panel 10. If the guide rails 30 have been overformed or underformed, they must be deformed until the tabs 62 can be forced into the slots 66. Bending the guide rails 30 to align the tabs 62 with the slots 66 can be very difficult since the breaker cradle 14 is made from heavy gauge steel and the bending must be done at the rear of the breaker compartment, thus making the insertion of the tabs 62 into the slots 66 extremely difficult. The minimum width of the slot 66 can also be restricted by tooling issues which concern the thickness of the material being punched and the force required to punch the slot 66. Slots 66 which have a width that is equal to or very near to the thickness of the material in which they are to be punched can require special tooling and/or frequent sharpening and realignment of the tooling. For ease of manufacturing, the slots 66 are usually made 30–50% wider than the thickness of the material in which they are being punched. Therefore, if the breaker cradle 14 and back panel 10 are of the same material thickness, some movement between the guide rails 30 and the back panel 10 will be unavoidable due to the width of the slot 66. Thus a precise X-axis alignment between the guide rails 30 and back panel 10 is prohibited.

The alignment issues described above have not been a significant problem with prior art devices since only a few secondary contacts 26 were required. Further, those secondary contacts 26 were generally of the blade and spring-biased jaw type or stab and spring-biased wiper type. These types of contacts 26 will tolerate misalignments in the range of ±0.1875 inch along the X-axis, ±0.0625 inch along the Y-axis and ±0.375 inch along the Z-axis.

Referring now to FIG. 3, a back panel 70 and breaker cradle 74 constructed in accordance with the present invention are shown. With the introduction of more sophisticated circuit breakers, there has been a demand for more secondary contacts to facilitate the many control and monitoring functions now available. This demand has required the manufacturer to put more contacts in the previously provided space. The solution has been to use miniature pin and socket type connectors generally illustrated as reference numeral 78 in FIG. 3. These miniature pin and socket connectors are commercially available from manufactures such as AMP Corporation, whose part No. 211778-1 is used in this embodiment. Miniature connectors, however, are small and rather fragile when compared to the secondary contacts of the prior art described above. Therefore, a more precise alignment between the breaker cradle 74 and the back panel 70 becomes an important issue in determining a proper alignment of the secondary contacts 78. AMP advertises, on page 2208 of their catalog 82750 revised 7-95, a blind mating misalignment tolerance of 0.090 inch in any direction for pin and socket connector Part No. 211778-1. This misalignment tolerance is much less than the acceptable tolerances for the larger more robust prior arts secondary contacts 26 described above. For the most part, the back panel 70 and breaker cradle 74 of the present invention appear to be much like the prior art back panel 10 and breaker cradle 14 of FIGS. 1 and 2. The back panel 70 is provided with an access opening 82 through which access to the stationary line and load (primary) contacts 83 is obtained. The stationary primary contacts 83 are fixed to the back panel 70 by bracing or other support means 84 attached to the back panel 70. The bracing or support means is attached to the back panel 70 by mechanical fasteners 85 received in mounting holes 86, which are located with substantial precision with respect to X and Y coordinates of the back panel 70. The back panel 70 also provides a surface on which the stationary secondary contacts 78 are mounted by mechanical fasteners such as screws 90. The location of the secondary contact mounting holes (not shown), which receive the screws 90, are also located with substantial precision with respect to X and Y coordinates of the back panel 70. The circuit breaker cradle 74 is much like the breaker cradle 14 of the prior art in that it is generally U-shaped with the two parallel sides forming guide rails 94. Each guide rail 94 has a top edge 98, which provides a smooth straight surface on which the grooved rollers of the circuit breaker are captivated and permitted to glide. Each guide rail 94 also includes a levering bracket 102 with a racking slot 106 for receiving the eccentric pin of the breaker cam for racking the breaker into and out of position. A stop notch 110 is also provided in each guide rail 94 to act as a positive stop for the circuit breaker rollers when the circuit breaker is fully installed. The stop notch 110 prevents the circuit breaker from being racked to far into the breaker compartment, which can cause damage to the primary and secondary contacts. An important difference between the breaker cradle 74 of the present invention and the breaker cradle 14 of the prior art, is the means by which the breaker cradle 74 is aligned with and attached to the back panel 70. The breaker cradle 74 is both aligned with and attached to the back panel 70 by locking tabs 114, best shown in FIG. 4, which are received within alignment slots 118 in the back panel 70. The individual elements and features of the locking tabs 114 and alignment slots 118, which provide the automatic alignment and locking together of the breaker cradle 74 and back panel 70, will be discussed in greater detail with respect to FIGS. 5 and 6. Mechanical hardware such as screws 122 can be used as a secondary means of attachment, but are not necessary. A flange 126 formed along the back bottom edge 130 of the breaker cradle 74 is provided with clearance holes through which the screws 122 can pass. The flange 126 is formed such that it does not contact the back panel 70 unless the screws 122 have been installed and tightened. Neither the flange 126 nor the screws 122 will affect the alignment between the breaker cradle 74 and the back panel 70. Each guide rail 94 of the breaker cradle 74 also includes an inwardly turned flange 134. The distance, generally indicated by the letter "A", between the edges 138 of these inwardly turned flanges 134 is dimensioned such that the circuit breaker is snugly received between them. Thus, the flanges provide additional protection against side-to-side movement (X-axis movement) of the breaker within the breaker compartment, which can be caused by a seismic event.

Figure 4:
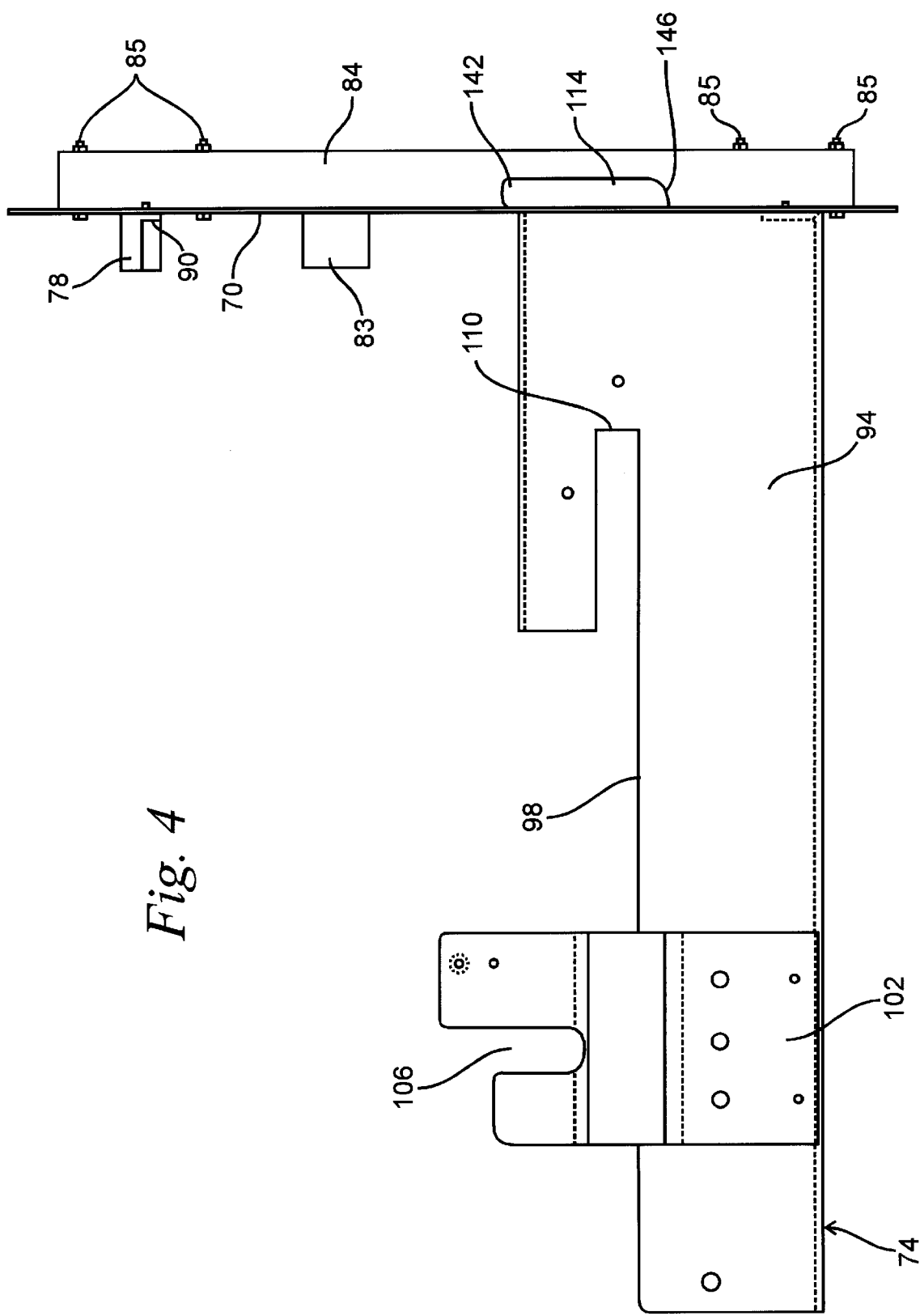
FIG. 4 is a side view of the back panel and breaker support arrangement of FIG. 3.

Referring now to FIG. 4, a side view of the assembled back panel 70 and breaker cradle 74 is shown. In this view it can be seen that the locking tab 114 includes an extended alignment/locking finger 142 and a generally rounded levering portion 146.

Figure 5:
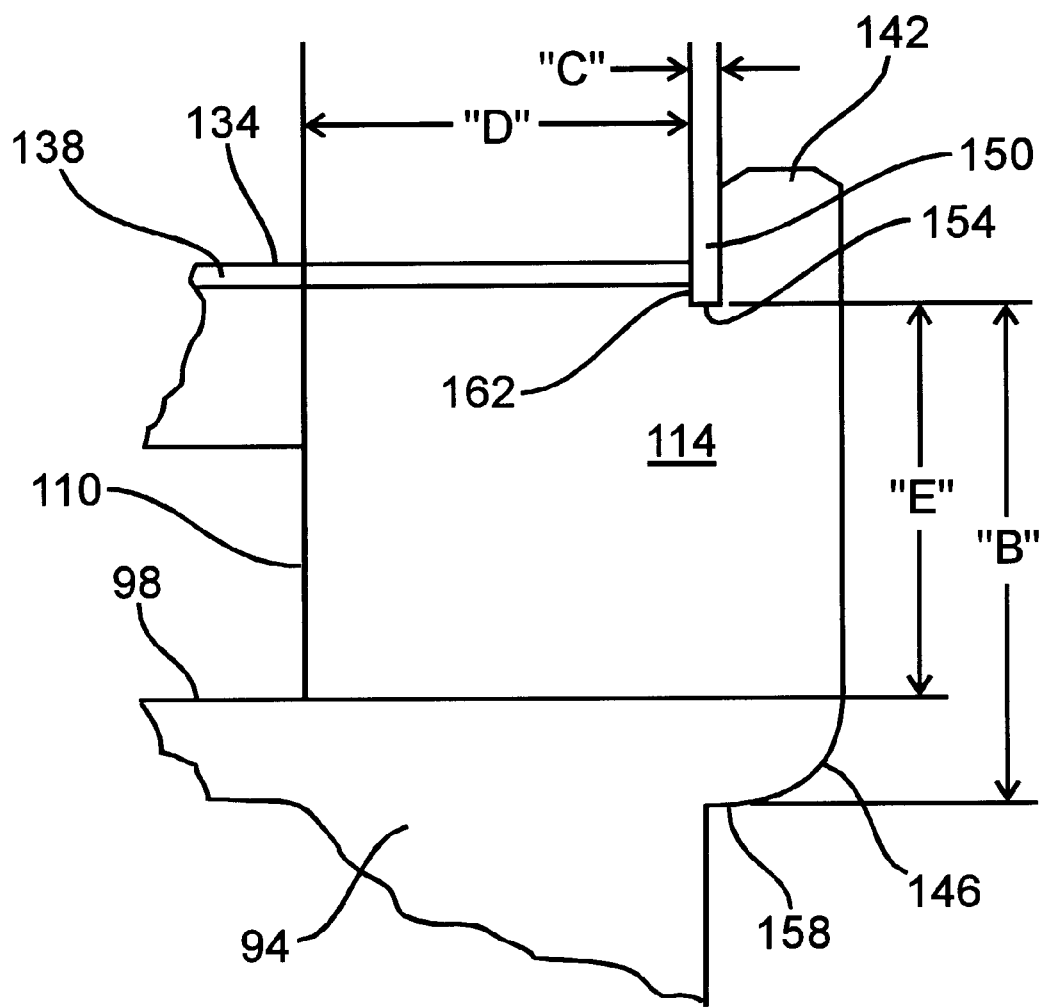
FIG. 5 is a detailed side view of the locking tab of the present invention.

FIG. 5 illustrates a detailed side view of the locking tab 114 and its unique locking and automatic alignment features. The locking tab 114 includes a Z-axis alignment slot 150 and a Y-axis alignment section, generally designated by reference letter "B", having a precisely maintained dimension. The precise dimension of the Y-axis alignment section "B" is defined by a bottom edge 154 of the Z-axis alignment slot 150 and a bottom edge 158 of the locking tab 114. The relevance of the "B" dimension to Y-axis alignment will be seen in the description of FIG. 6. A precisely maintained width, generally indicated by reference letter "C", of the Z-axis alignment slot 150 is dimensioned to frictionally and slidably receive the thickness (material thickness) of the back panel 70 at a top edge 170 (see FIG. 6) of the alignment slot 118. A precisely maintained dimension, generally indicated by reference letter "D", between a flange side 162 of the Z-axis alignment slot 150 and the stop notch 110, provides Z-axis alignment between the back panel 70 and the stop slot 110. By maintaining Z-axis alignment between the back panel 70 and the stop slot 110, Z-axis alignment is also maintained between the stationary contacts 78 and 83, which are fixed with respect to the back panel 70, and the breaker mounted movable contacts. Further, a precisely maintained dimension, generally indicated by reference letter "E", defined by the bottom edge 154 of Z-axis alignment slot 150 and the top edge 98 of the guide rail 94, provides Y-axis alignment between the back panel 70 and then top edge 98 of the guide rail 94. By maintaining Y-axis alignment between the back panel 70 and the top edge 98 of the guide rail 94, Y-axis alignment is also maintained between the stationary contacts 83, which are fixed with respect to the back panel 70, and the breaker mounted movable contacts. It is to be understood that the location of the bottom edge 154 and flange side 162 of the Z-axis alignment slot 150, the top edge 98 and stop slot 110 of the guide rail 94, and the bottom edge 158 of the locking tab 114 are all precisely maintained with respect to the X and Y coordinates of one another.

Figure 6:
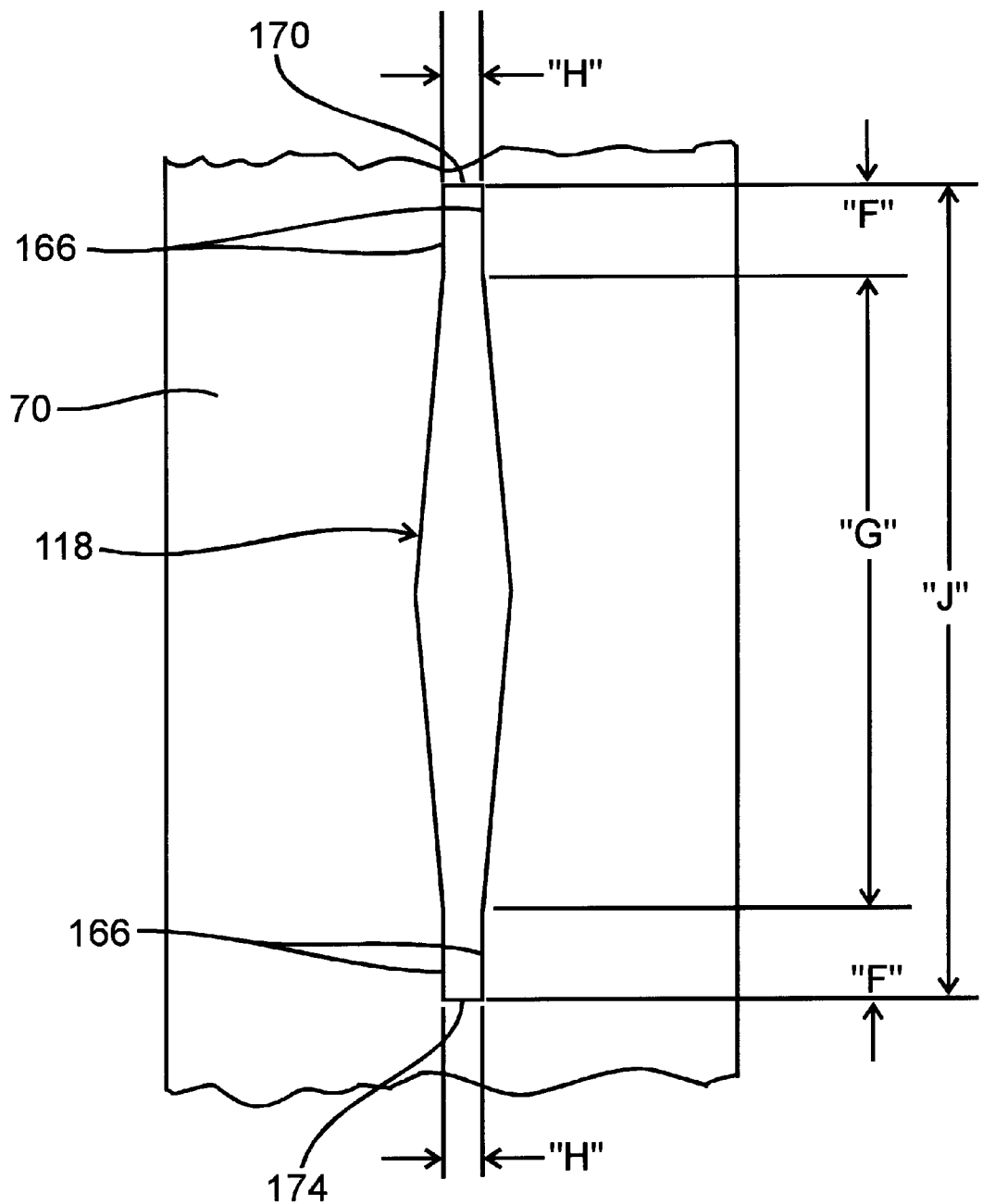
FIG. 6 is a detailed front view of the alignment slot of the present invention.
Figure 7:
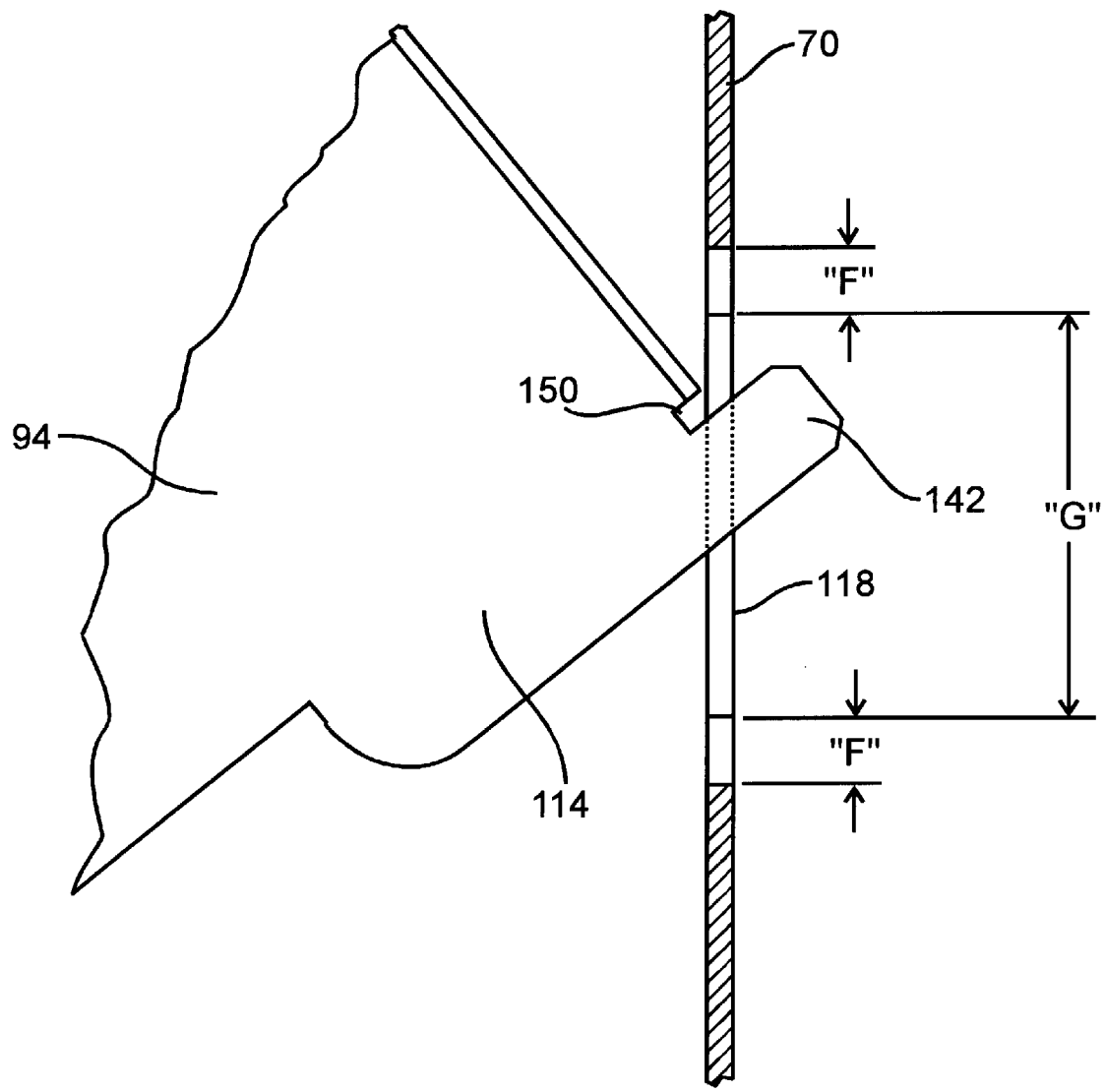
FIG. 7 illustrates the relative position of the locking tab with respect to the alignment slot at the start of insertion into the slot.

Referring now to FIG. 6, a more detailed view of the alignment slot 118 is shown. The alignment slot 118 includes two generally rectangular shaped indexing sections, each designated by reference letter "F", which are spaced apart by a generally parallelogrammatically or semi-elliptically shaped alignment section designated by reference letter "G". The precisely maintained width, generally indicated by reference letter "H", of each indexing section "F", is dimensioned to permit a slidable friction fit of the locking tab 114 width (material thickness) between its parallel sides 166. The frictional fit of the locking tab 114 between the two parallel sides 166 of the indexing section "F" provides a precise X-axis alignment between the guide rail 94 and the back panel 70. The length of the alignment slot 118 between its top edge 170 and bottom edge 174, generally indicated by reference letter "J", is dimensioned to permit a slidable friction fit of the Y-axis alignment portion "B" of tab 114 in FIG. 5. The friction fit of portion "B" within the length "J" of the alignment slot 118 provides a precise Y-axis alignment between the guide rails 94 and the back panel 70. The generally parallelogrammatically or semi-elliptically shaped alignment section "G", being significantly wider at its midpoint than the rectangular indexing sections "F", and uniformly tapered into the precisely maintained width of the indexing sections "F" provides automatic X-axis alignment of the guide rail 94 as the locking tab 114 is being slidably received within the alignment slot 118. It is to be understood that the location and dimensions of the parallel sides 166 and the top and bottom, 170 and 174, respectively, of the alignment slot 118 and the mounting holes for the stationary primary and secondary contacts are located with substantial precision with respect to X and Y coordinates of the back panel 70. By maintaining X-axis alignment between the back panel 70 and the top edge 98 of the guide rail 94, X-axis alignment is also maintained between the stationary contacts 83, which are fixed with respect to the back panel 70, and the breaker mounted movable contacts.

Referring now to FIGS. 7–10, the process of assembling the breaker cradle 74 and back panel 70 is illustrated in steps. Starting with FIG. 7, the initial insertion of a locking tab 114 into an alignment slot 118 is illustrated. To start the assembly process, the longitudinal axis of the breaker cradle 74 is positioned at an angle of approximately 30–45 degrees with respect to the back panel 70. This angle permits the alignment/locking finger 142 of the locking tab 114 to be easily inserted into the alignment section "G" of the alignment slot 118. The alignment/locking finger 142, being a smaller projecting part of the locking tab 114 is easily received in the wider alignment section "G" of the alignment slot 118, even if some slight overforming or underforming of the guide rail 94 has occurred. The assembly process continues by rotating the breaker cradle 74 downwardly which causes the alignment/locking finger 142 to be captivated behind the back panel 70 at the top edge 170 of the alignment slot 118.

Figure 8:
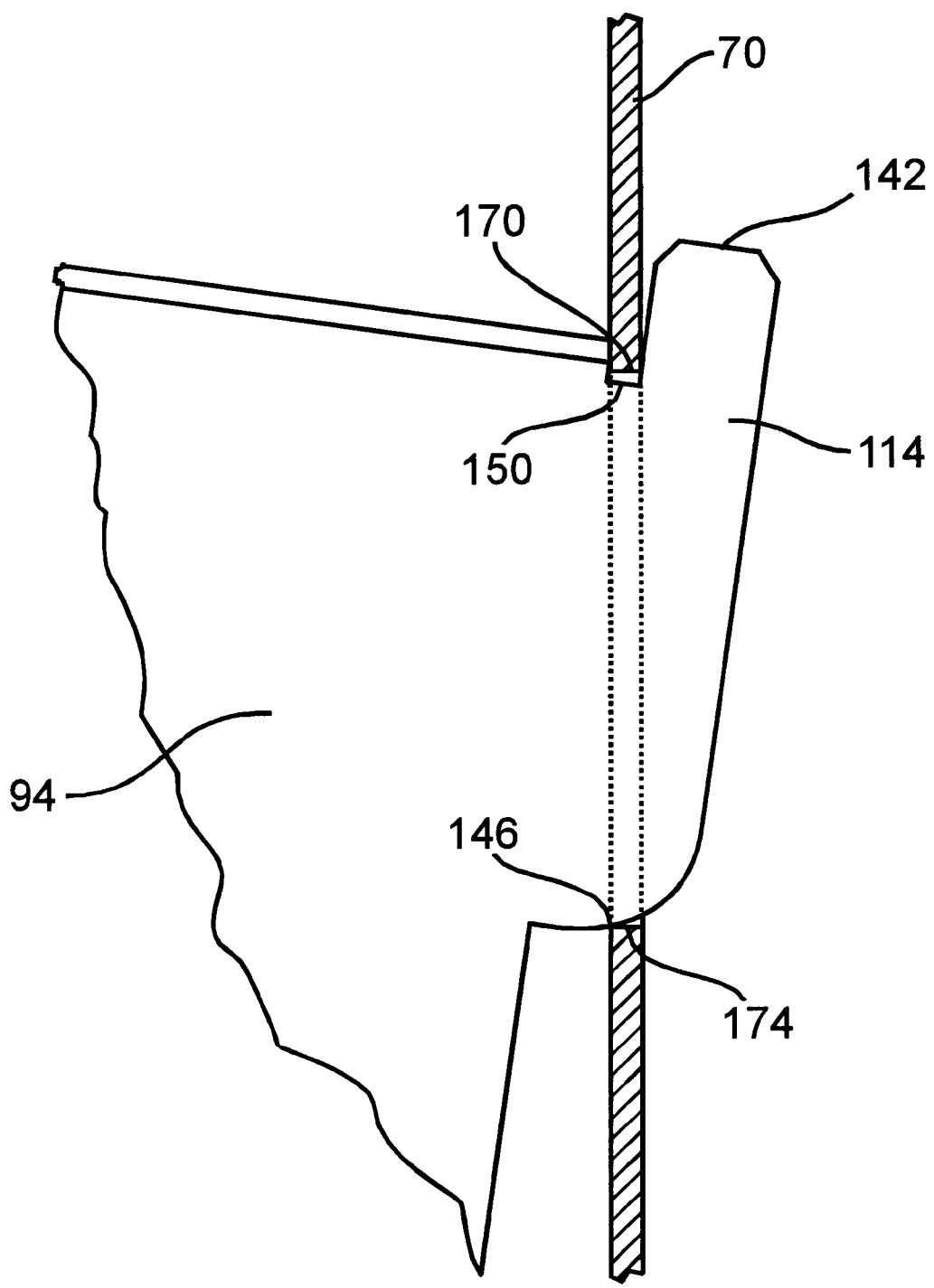
FIG. 8 illustrates the relative position of the locking tab with respect to the alignment slot just prior to final locking in the slot.

FIG. 8 illustrates the assembly process at a point wherein the alignment/locking finger 142 is captivated behind the back plate 70 and locking tab 114 is almost fully inserted into the alignment slot 118. At this point, the frictional fit between the top edge 170 of the alignment slot 118 and the "C" width of the z-axis alignment slot 150 begins. To assist in completing this friction fit, the levering portion 146 of the locking tab 114 engages the bottom edge 174 of the alignment slot 118. As the breaker cradle 74 is rotated into final position, this engagement causes the Z-axis alignment slot 150 of the locking tab 114 and the top edge 170 of the alignment slot 118 to be levered into a mating position.

Figure 9:
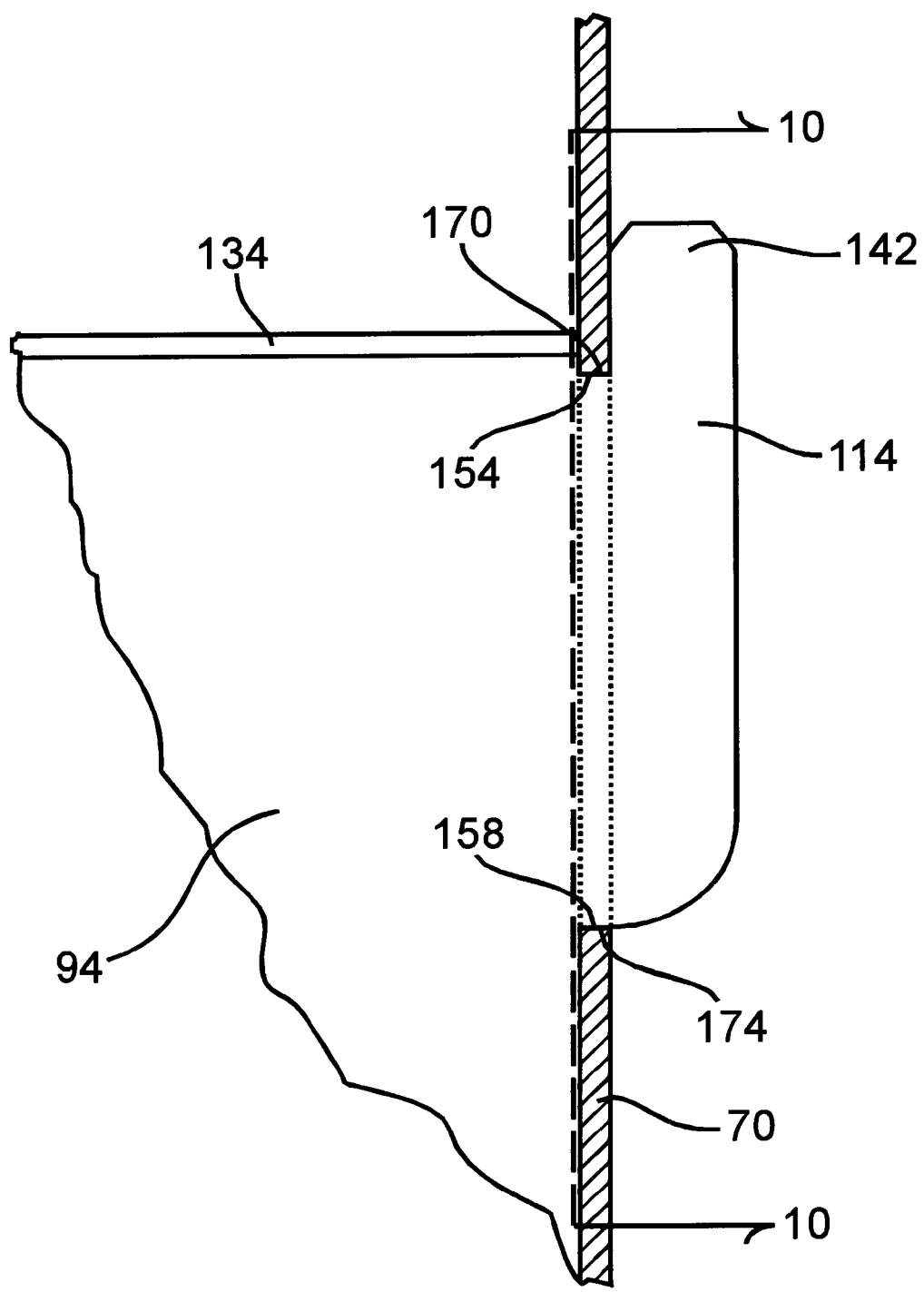
FIG. 9 is a side view illustrating the final locked position of the locking tab in the alignment slot.

FIG. 9 illustrates the final assembled position of the breaker cradle 74 locking tab 114 with respect to the alignment slot 118 of the back panel 70. In this position, the top edge 170 of the alignment slot 118 frictionally engages the bottom edge 154 of the Z-axis alignment slot 150, while the bottom edge 174 of the alignment slot 118 frictionally engages the bottom edge 158 of the locking tab 114. The frictional fit between these elements of the breaker cradle 74 and the back panel 70 provide the substantially precise Y-axis and Z-axis alignment between points on the breaker cradle 74 and back panel 70.

Figure 10:
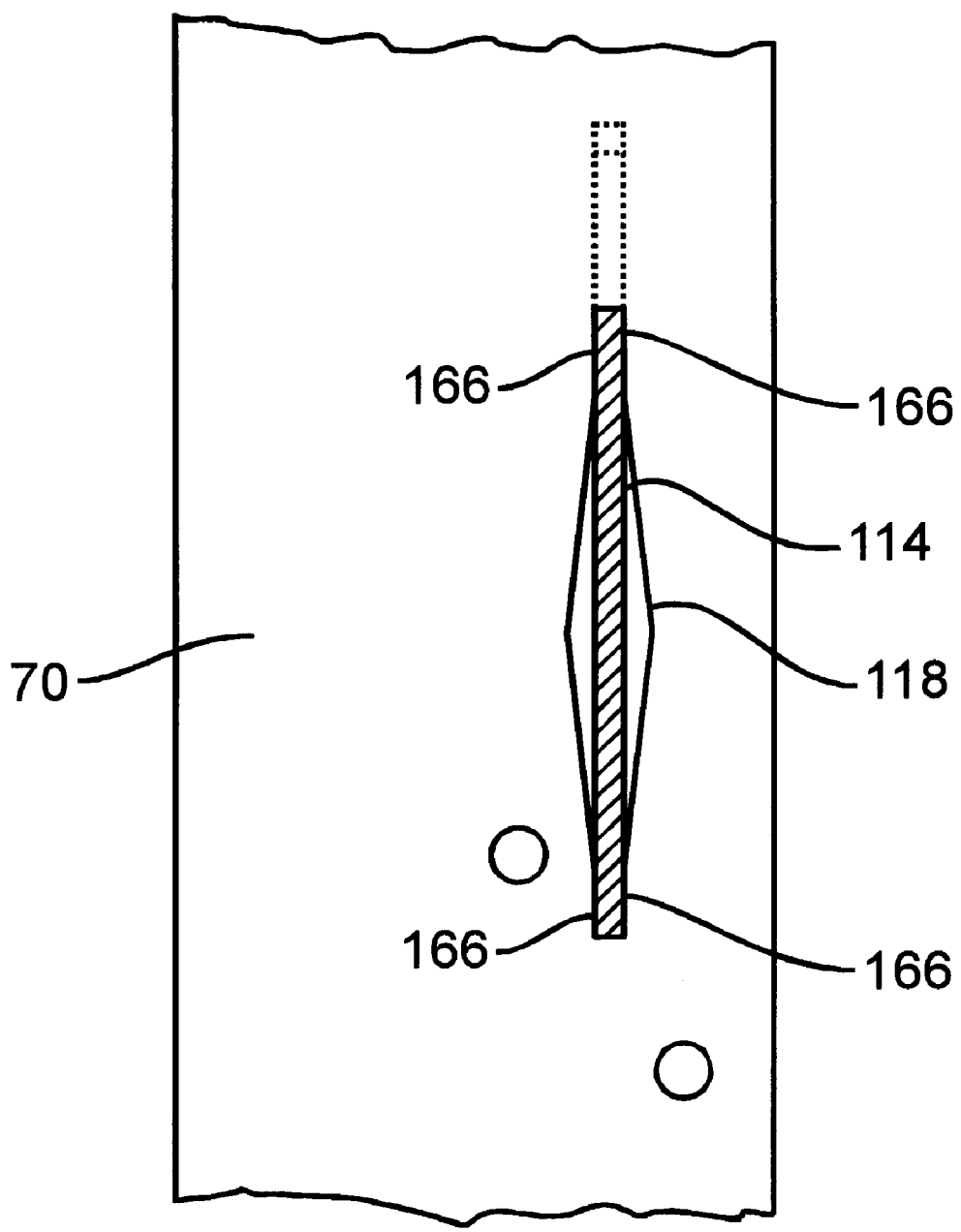
FIG. 10 is a partial section view taken along line 10—10 of FIG. 9 showing an end view of the locking tab fully inserted into the alignment slot.

FIG. 10 is a sectional view taken along lines 10—10 of FIG. 9 and illustrates the frictional fit between the parallel sides 166 of the alignment slot 118 with the locking tab 114. The frictional fit between these elements of the breaker cradle 74 and the back panel 70 provides the precise X-axis alignment between points on the breaker cradle 74 and back panel 70.

I claim:

1. An apparatus for aligning contacts externally mounted on a circuit breaker with associated contacts mounted in a circuit breaker component; the apparatus comprising:

a switchgear enclosure having at least one circuit breaker compartment for receiving the circuit breaker;

a generally flat back panel mounted within said circuit breaker compartment such that said back panel defines a rear wall of said circuit breaker compartment, said back panel defining an access opening and at least one alignment slot having two indexing sections spaced apart by an alignment section, said two indexing sections being located with respect to X and Y coordinates of said back panel, said back panel further defining a first set of mounting holes and a second set of mounting holes, each of said first and second sets of mounting holes being located with respect to X and Y coordinates of said back panel and therefore being located with respect to said two indexing sections of said at least one alignment slot such that precise X-axis and Y-axis alignment is substantially maintained between each of said first and second sets of mounting holes and said two indexing sections of said at least one alignment slot;

at least one stationary primary contact for being associated with at least one breaker primary contact, said at least one stationary primary contact being supportably mounted by means of hardware passing through said first set of mounting holes such that said at least one stationary primary contact is in fixed relationship with said two indexing sections of said at least one alignment slot, said at least one stationary primary contact being accessible through said access opening in said back panel;

at least one stationary secondary contact for being associated with at least one breaker secondary contact, said at least one stationary secondary contact being mounted on said back panel by hardware means passing through said second set of mounting holes such that said stationary secondary contact is in fixed relationship with said two indexing sections of said at least one alignment slot, and a locking/locating cradle for receiving and supporting the circuit breaker within said circuit breaker compartment, said locking/locating cradle having two generally parallel guide rails spaced apart by an integrally formed bottom, said guide rails having a top edge which provides X-axis and Y-axis locating for the circuit breaker, at least one of said guide rails having a locking tab configured to be frictionally received within said at least one alignment slot of said back panel such that said guide rail is located with respect to X and Y axes of said back panel by said two indexing sections of said at least one alignment slot and is locked to said back panel by captive engagement of said locking tab in said at least one alignment slot such that said guide rail is located with respect to the Z-axis of said back panel.

2. The apparatus of claim 1 wherein said alignment section of said at least one alignment slot is widest near its midpoint and narrows into said two indexing sections at each end.

3. The apparatus of claim 2 wherein said locking tab further includes an alignment/locking finger which extends outwardly from said locking tab and is easily inserted in said alignment section of said alignment slot such that any X-axis misalignment of said guide rail with respect to said alignment slot is automatically corrected as said locking tab is inserted further into said alignment slot.

4. The apparatus of claim 3 wherein said locking tab includes a Z-axis alignment slot located generally between said guide rail and said alignment/locking finger and being defined by two parallel sides and a bottom edge, said bottom edge of said Z-axis alignment slot being generally intermediate and perpendicular to said parallel sides, said parallel sides and said bottom edge of said Z-axis alignment slot being located with respect to X, Y and Z coordinates of said guide rail, said Z-axis alignment slot being dimensioned to snugly receive the thickness of said back panel.

5. The apparatus of claim 4 wherein said two indexing sections of said alignment slot are generally rectangular in shape, each having two parallel sides and being aligned vertically such that one of said indexing sections is directly above the other of said indexing sections, said parallel sides also being parallel to the Y-axis of said back plate and therefore being an X-axis index for said back panel, the upper of said two indexing sections defining a top edge of said alignment slot, said top edge being intermediate and generally perpendicular to said two parallel sides, the lower of said two indexing sections defining a bottom edge of said alignment slot, said bottom edge being intermediate and generally perpendicular to said two parallel sides, said top edge and said bottom edge being generally parallel to one another and to the X-axis of said back panel and therefore being a Y-axis alignment index for said back panel.

6. The apparatus of claim 5 wherein said locking tab further includes a Y-axis alignment section defined by said bottom edge of said Z-axis alignment slot and a bottom edge of said locking tab, said Y-axis alignment section being dimensioned to frictionally fit between said top and bottom edges of said alignment slot thereby captivating said alignment/locking finger behind said back panel and providing Y and Z-axis alignment between said guide rail and said back panel.

7. The apparatus of claim 6 wherein said two indexing sections of said alignment slot are dimensioned to frictionally receive the width of said locking tab, providing X-axis alignment between said guide rail and said back panel.

8. The apparatus of claim 2 wherein said alignment section of said at least one alignment slot is generally parallelogrammatic in shape.

9. The apparatus of claim 2 wherein said alignment section of said at least one alignment slot is generally semi-elliptical in shape.

10. An apparatus for aligning the external contacts of a draw-out type circuit breaker with associated contacts of a circuit breaker compartment; the apparatus comprising:

an enclosure having at least one circuit breaker compartment for slidably receiving the draw-out type circuit breaker;

a locking/locating cradle having two generally parallel guide rails spaced apart by an integrally formed bottom, said guide rails receiving, supporting and locating the circuit breaker within said circuit breaker compartment and with respect to elements within said circuit breaker compartment, at least one of said side rails having a locking tab and defining a Z-axis alignment slot;

a generally flat back panel mounted within said circuit breaker compartment such that said back panel defines a rear wall of said circuit breaker compartment, said back panel defining at least one alignment slot having its longitudinal axis aligned with the Y-axis of said back panel and configured for automatically correcting X-axis misalignment between said guide rail and said alignment slot during attachment of said locking/locate cradle to said back panel, said at least one alignment slot having a top edge being located with respect to X and Y coordinates of said back panel, said back panel further defining a first set of mounting holes and a second set of mounting holes, each of said first and second sets of mounting holes being located with respect to said top edge of said at least one alignment slot such that precise X-Y axes alignment is substantially maintained between each of said first and second sets of mounting holes and said top edge of said at least one alignment slot;

at least one stationary primary contact associated with at least one breaker primary contact, said at least on stationary primary contact being mounted on said back panel by means of said first set of mounting holes; and at least one stationary secondary contact associated with at least one breaker secondary contact, said at least one stationary secondary contact being mounted on said back panel by means of said second set of mounting holes, said at least one stationary primary contact and said at least one stationary secondary contact being maintained in precise alignment with the at least one associated breaker primary contact and the at least one associated breaker secondary contact by the interlocking of said Z-axis alignment slot of locking tab and top edge of said alignment slot.

11. The apparatus of claim 10 wherein said locking tab further includes an alignment/locking finger extending outwardly from said locking tab in such a manner as to be generally spaced apart from said locking tab by said Z-axis alignment slot.

12. The apparatus of claim 11 wherein said at least one alignment slot further includes two indexing sections spaced apart by an alignment section, each said indexing section having two generally parallel sides being generally aligned along the Y-axis of said back panel, said generally parallel sides of the upper of said two indexing sections being spaced apart by said top edge of said at least one alignment slot.

13. The apparatus of claim 12 wherein said alignment section of said at least one alignment slot is widest near its midpoint such that said alignment/locking finger of said locking tab of said at least one guide rail can be easily inserted therein and narrows into said two indexing sections at each end such that automatic X-axis misalignment of said guide rail is substantially corrected as said locking tab is further inserted into said at least one alignment slot.

14. The apparatus of claim 13 wherein upon complete insertion of said locking tab into said at least one alignment slot said top edge of said at least one alignment slot engages said Z-axis alignment slot of said locking tab providing precise Y and Z-axes alignment between said guide rail and said back panel while said locking tab is frictionally received between said generally parallel sides of said two indexing sections of said at least one alignment slot, providing precise X-axis alignment between said guide rail and said back panel and thereby providing precise alignment between said at least one breaker primary contact and its associated said at least one stationary primary contact and between said at least one breaker secondary contact and its associated said at least one stationary secondary contact.

15. The apparatus of claim 13 wherein said alignment section of said at least one alignment slot is generally parallelogrammatic in shape.

16. The apparatus of claim 13 wherein said alignment section of said at least one alignment slot is generally semi-elliptical in shape.

17. An apparatus for aligning the external contacts of a draw-out type circuit breaker with associated contacts of a circuit breaker compartment; the apparatus comprising:

an enclosure having at least one circuit breaker compartment for slidably receiving the circuit breaker;

a locking/locating cradle having two generally parallel guide rails spaced apart by an integrally formed bottom, said guide rails receiving, supporting and locating the circuit breaker within said circuit breaker compartment, at least one of guide side rails having a locking tab;

a generally flat back panel mounted within said circuit breaker compartment such that said back panel defines a rear wall of said circuit breaker compartment, said back panel defining at least one alignment slot configured for easy insertion of said locking tab and automatic alignment and locking of said guide rail with said back panel by a frictional fit between said locking tab and said at least one alignment slot, said back panel further defining a first set of mounting holes and a second set of mounting holes, each of said first and second sets of mounting holes being located precisely on said back panel with respect to said at least one alignment slot such that precise X and Y axes alignment is maintained between each of said first and second sets of mounting holes and said at least one alignment slot;

at least one stationary primary contact being associated with at least one breaker primary contact, said at least on stationary primary contact being mounted on said back panel using said first set of mounting holes; and at least one secondary stationary contact being associated with at least one breaker secondary contact, said at least on stationary secondary contact being mounted on said back panel using said second set of mounting holes.

18. The apparatus of claim 17 wherein said locking tab further includes an alignment/locking finger extending outwardly from said locking tab in such a manner as to define a Z-axis alignment slot generally between said guide rail and said alignment/locking tab.

19. The apparatus of claim 18 wherein said at least one alignment slot further includes two indexing sections spaced apart by an alignment section, each said indexing section having two generally parallel sides being aligned with the Y-axis of said back panel, said generally parallel sides of the upper of said two indexing sections being spaced apart by a top edge of said at least one alignment slot, said top edge being aligned with the X-axis of said back panel.

20. The apparatus of claim 19 wherein said alignment section of said at least one alignment slot is widest near its midpoint such that said alignment/locking finger of said locking tab of said at least one guide rail can be easily inserted therein and narrows into said two indexing sections at each end such that automatic X-axis misalignment of said guide rail is corrected as said locking tab is further inserted into said at least one alignment slot.

21. The apparatus of claim 20 wherein upon complete insertion of said locking tab into said at least one alignment slot said top edge of said at least one alignment slot engages said Z-axis alignment slot of said locking tab, thereby providing precise Y and Z axes alignment between said guide rail and said back panel while said locking tab is frictionally received between said generally parallel sides of said two indexing sections of said at least one alignment slot, thereby providing precise X-axis alignment between said guide rail and said back panel and thereby providing precise alignment between the at least one breaker primary contact and its associated said at least one stationary primary contact and between the at least one breaker secondary contact and its associated said at least one stationary secondary contact.

* * * * *